Sept. 17, 1935. J. O. ALMEN ET AL 2,014,920
FRICTION GEARING
Filed May 31, 1932 3 Sheets-Sheet 1

Inventors
John O. Almen
Jacob Ehrlich &
Winfield D. Gove

By Blackmore, Spencer & Flint
Attorneys

Sept. 17, 1935.  J. O. ALMEN ET AL  2,014,920
FRICTION GEARING
Filed May 31, 1932  3 Sheets-Sheet 2
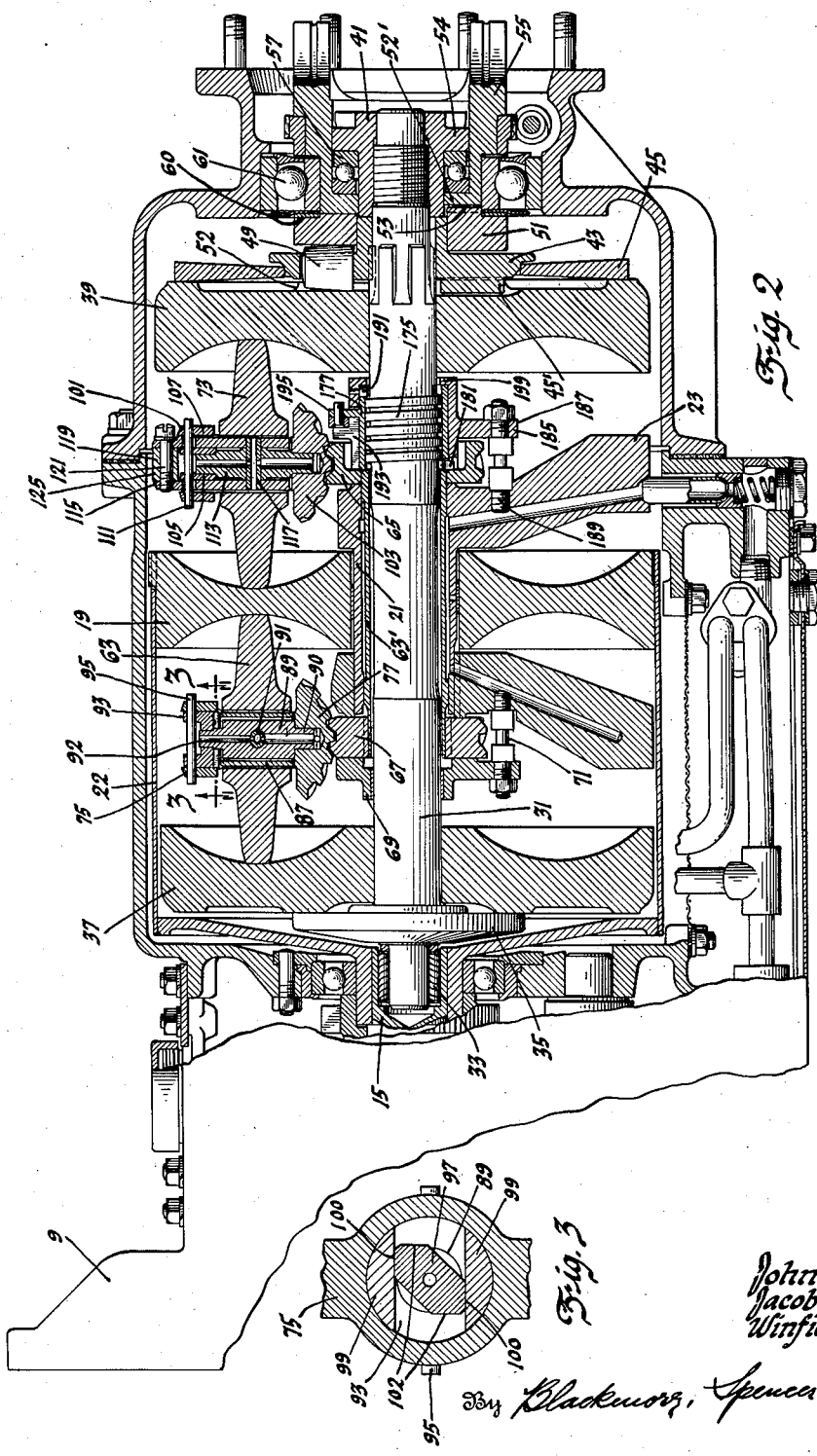

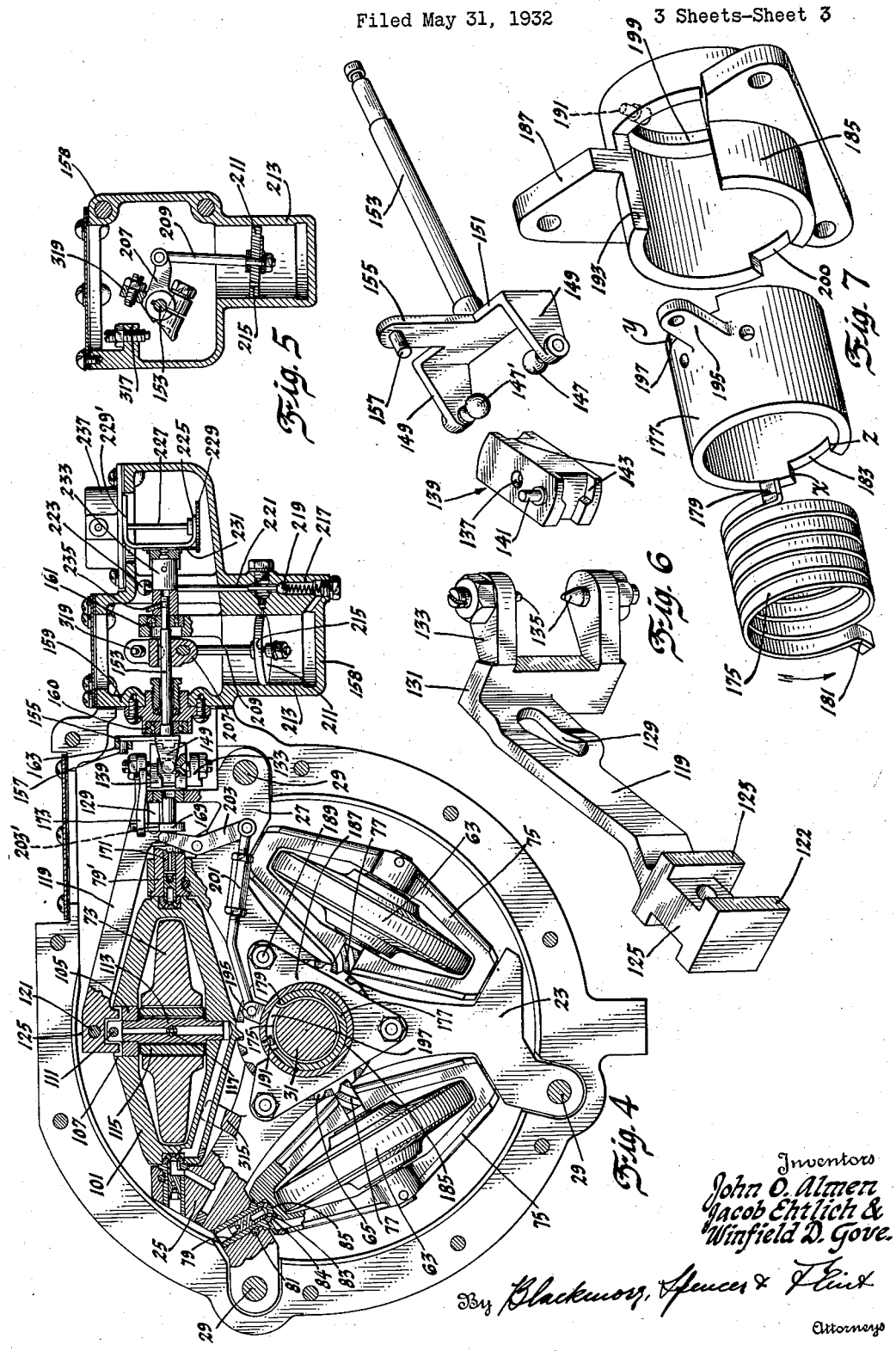

Patented Sept. 17, 1935

2,014,920

UNITED STATES PATENT OFFICE 2,014,920

FRICTION GEARING

John O. Almen, Royal Oak, and Jacob Ehrlich and Winfield D. Gove, Detroit, Mich., assignors, by mesne assignments, to General Motors Corporation, Detroit, Mich., a corporation of Delaware Application May 31, 1932, Serial No. 614,332

14 Claims. (Cl. 74—200)

The invention which constitutes the subject of this application is an improvement in a variable speed transmission mechanism employing a plurality of races or discs having toroidal raceways and interposed friction rollers. The invention has been designed primarily for use on motor vehicles.

The essential objects sought for in prior known transmissions of this kind, such as the provision of an overspeed drive made possible by the tilting of the rollers in both directions from their normal position in which they give a 1:1 ratio; the provision for neutral and reverse driving by the use of a reversing gear transmission between the engine and the friction transmission; the automatic control of the pressure upon the rollers by the driving torque and many other advantages are among the objects of this present invention. Certain additional advantages are attained by the subject matter herein disclosed. Among them are the following:

1. An improved mounting of the follower or secondary rollers whereby for reverse roller rotation the mounting is such as to reverse the direction of the imparted inclination. Specifically this object is attained by novel structure whereby differential friction in the roller mounting automatically determines the position of the movable element in the mounting.

2. An improved mounting for the master roller adapted for a transmission wherein the tilting of the master roller operates positively to tilt the follower rollers without resort to torque equalization.

3. An improved mechanism operated automatically by reversing the direction of rotation of the driving mechanism to reverse the direction of inclination of the master roller produced by an externally applied force. Specifically this is accompanied by a sliding or tilting control block, the movement of which is effected by a reversed rotation of the output shaft and the changed position of which causes the direction of inclination of the master roller to be reversed when a predetermined external force is applied to the block. Structurally the invention also comprises novelty in the provision of a coil spring and sleeve reversing mechanism associated with the output shaft and stop mechanism associated therewith.

4. An improved bearing for the roller carriers.

5. A novel connection between the driving disc and its connection with the input shaft occasioned and made possible by the use of the supporting spider for the roller carriers as the locating means rather than by using the input shaft for that purpose as in certain prior proposed constructions.

6. The operation of the master roller upon the follower rollers through the instrumentality of a central sleeve provided with gears.

7. The provision of suitable stops to limit the extent of tilting.

8. An improved means to control the rate of ratio change under the influence of a governor or other externally applied force.

9. An improved means whereby a quick shift down to low speed is attained, preferably rendered automatically operable by the action of brake application.

10. An improved device whereby the speed ratio at any one time is indicated to the operator.

Other objects and advantages will be understood from the following description.

In the drawings accompanying this description, Fig. 1 is a top plan view, partly broken away and in section.

Fig. 2 is a view in vertical section.

Fig. 3 is a view as seen from line 3—3 of Fig. 2.

Fig. 4 is an end elevation, partly in section, showing the operating mechanism for controlling the master roller.

Fig. 5 is a longitudinal section through the auxiliary housing containing the dashpot mechanism.

Fig. 6 is a perspective of parts in disassembled relation.

Fig. 7 is a perspective of the reversing mechanism shown in Fig. 2 with the parts disassembled.

Figures 1, 8:
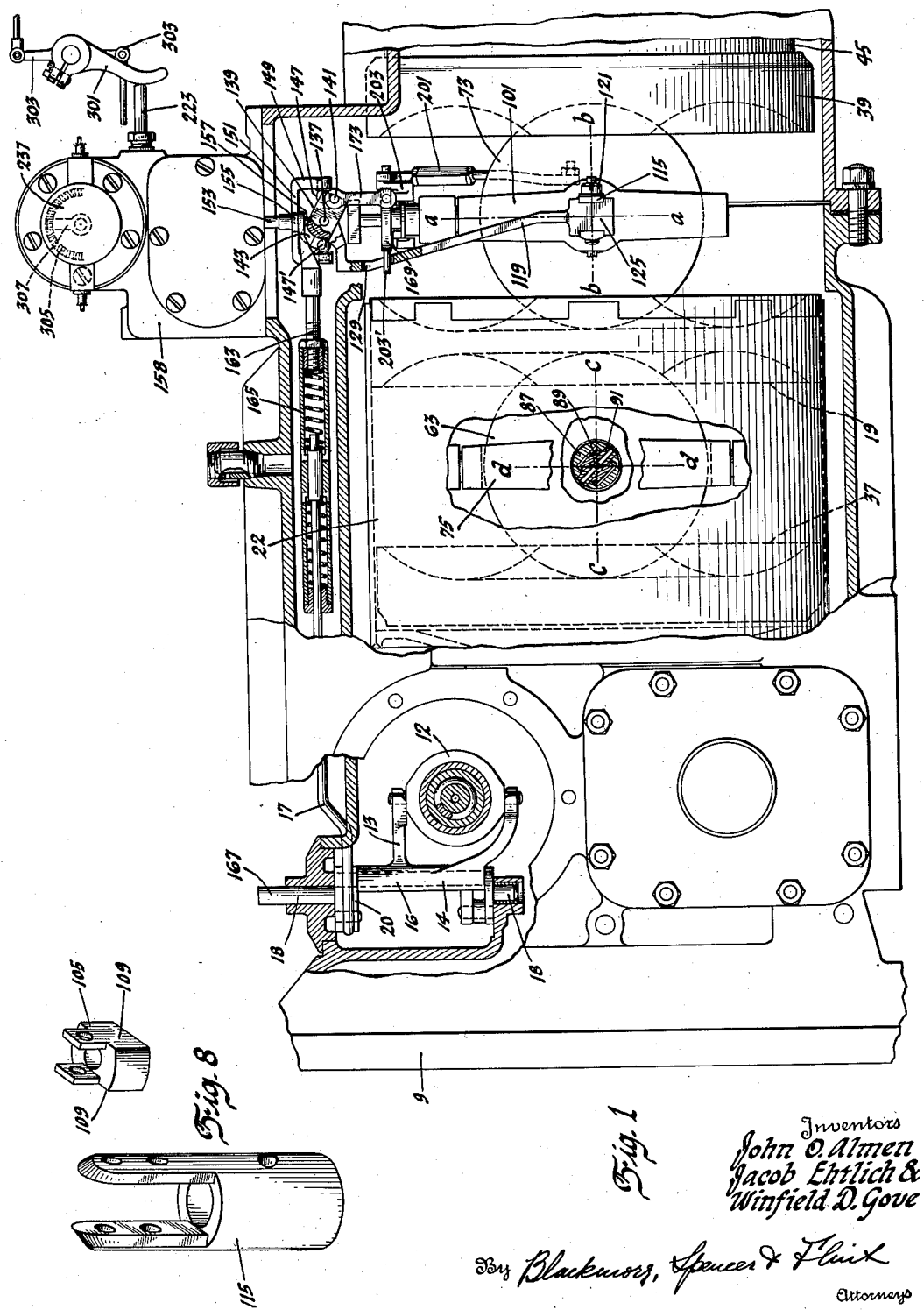
Fig. 8 shows certain parts in perspective and in dissassembled relation.

Referring by reference characters to the drawings, numeral 9 is a housing for a main clutch and reversing gear. No invention is herein claimed for any specific clutch, and any preferred type of reversing gear may be employed. A fork 13 is rocked by the movements of a ring 12 reciprocated by a governor, not shown, which is operably associated with the input shaft of the transmission. The fork is pivoted on pin 14 carried by a rocking member 16. The pin 14 is eccentrically positioned relative to the trunnions 18 about which the member 16 rocks. A rod 17, extending toward the rear of the transmission, is connected to an arm 20 extending from the fork member 13. If the member 16 be assumed to be held in position the rotation of fork 13 about the axis of 14 as influenced by the governor operates through the arm 20 to push or pull the rod 17 and thereby to change the speed ratio of the transmission as will be explained below. On the other hand if the governor is holding the fork 13 fixed, a manually operated rotation of rocking member 16 (for example by turning an extension 167 of the journaled axis 18) will cause a bodily movement of the pivot axis 14 and thereby rock the fork about its connection with ring 12. This, too, will reciprocate rod 17 and change the speed ratio.

The input shaft 15 is connected to the driving disc 19 by a cup-shaped member 22 secured to the disc 19 by a sliding non-rotatable connection as shown in Fig. 2. The driving disc rotates on a hub 21 constituting a part of a double spider. At each end of the hub the spider is formed with diverging arms, these arms at one end being represented by numerals 23, 25, and 27 on Fig. 4. These arms are suitably secured to the casing as at 29. At 31 is shown the driven shaft having at its front end a pilot bearing 33 in the end of the input shaft 15, and a flange 35 secured to a first driven disc 37. Shaft 31 extends through the hub 21 and near its rear end there is mounted freely thereon a second driven disc 39. At the rear end of the shaft 31 is a flanged nut 41 threaded on the shaft. The front end of the nut engages the hub of a collar 43 non-rotatably but slidably mounted on the shaft. A disc-like spring 45 engages a shoulder on the collar and also engages the periphery of disc 39 to push the disc 39 forward and to pull the disc 37 (through the instrumentality of the collar 43, nut 41, and shaft 31) toward the rear thus holding the rollers under pressure between the discs. There is a spline and grooving connection interlocking the disc 39 and the collar 43 as shown at 45'. This connection, together with the splined connection of collar 43 on the shaft 31, permits the necessary slight axial movement of the disc 39 but prevents any rotation of disc 39 relative to the shaft. Adjustment of the collar 41 on the shaft operates in an obvious manner to determine pressure resiliently applied between the rollers and the discs. Torque-loading rollers 49 mounted in openings in the collar 43 engage inclined surfaces on the disc 39 and a spacing collar 51 (the inclined surfaces are shown by numeral 52). The collar 51 is supported on a hub portion of collar 43 and has a radially splined connection as at 53 with a flange 52' of a universal joint member 55. Between the flange 52' and a radial flange 54 on the nut 41 which engages the universal joint member 55, there is a thrust bearing 57. It will be seen that the engagement of the flange 52' with the hub of nut 41 and the engagement of flange 54 of the nut 41 with the inner surface of the joint member 55 serves to properly position the universal joint in such a way as to prevent anything but axial thrusts being delivered by this joint member to the transmission. Around the outside of the universal joint member 55 and within the casing are conventional bearings 61. A flat spring 60 located as shown is in series with the torque-loading rollers. Its function is to avoid looseness when the device is not under load.

Between the disc 19 and each of the discs 37 and 39 are the friction rollers, one of which is designated at 63 on Fig. 2. The several rollers engage the toric raceways of the disc. The adjustment of nut 41 controls the normal pressure between the discs and rollers. Heavy torque operates through the rollers 49 and the cam surfaces 52 to add pressure between the discs and rollers and prevents slipping.

Surrounding the shaft 31 and within hub 21 is a tubular ring member 63'. Welded or otherwise secured to this ring at one end is a gear 65. A gear member 67 is splined to the other end of ring 63'. An abutment member 69 engages the gear 67 on one side and is supported on shaft 31. The other side of gear 65 engages the fixedly supported spider as shown. The member 69 is connected to the spider by a spacing and fastening means 71. In this way the gear members 65 and 67 are mounted in definite relation to the spider. This is important because the roller carriers, referred to below, have gear elements in mesh with gears 65 and 67, and these roller carriers are mounted on the spider. In this way the correct engagement of the gears 65 and 67 with the gears of the roller carriers is made certain, even when the two parts of the spider approach or recede under the influence of the torque loading device.

There are two sets of rollers typified by rollers 63. The rollers of each set are angularly spaced. Each set in the embodiment illustrated has three rollers spaced at angular intervals of 120°. The rollers of the two sets are similarly disposed so that the same radial planes include the centers of both sets. Numeral 63 is used to designate the five so-called follower rollers. The roller marked 73 is the so-called master roller since its function, in addition to serving as the driving roller, is to control the driving ratio position of the several rollers marked 63.

Each roller is mounted in a carrier. The carriers for roller 63 are designated by numeral 75. These carriers are provided with or formed integral with gear elements 77 which mesh with the gears 65 or 67 as the case may be. The carriers are mounted at their ends in the spider arms as shown in Fig. 4. The mounting permits the carrier and its roller to assume positions for driving at varying speed ratios. Such angular positions may be considered as due to the rocking of the carrier and the roller about the pivotal connection between the carrier and the spider. This rocking movement which produces changes in driving ratio is called "tilting". In opposite spider arms is a hollow plug 79 held from rotation by a pin 81. A spherical cap 83 is fitted to the inner end of each of the plugs 79, the polar end of which spherical cap provides what is substantially a point contact as at 85 in the bottom of a pocket 84 formed in the carrier. The wall at the outer end of the pocket surrounds the base of the cap. Preferably the cap is somewhat more than the hemisphere and contacts with the wall of the pocket along a circumferential line. As a result of this construction the bearings permit such a rotation of the carrier as is adapted to produce a tilting of the roller to effect changes in gear ratio.

The mounting of the rollers 63 in the carriers 75 is next to be described. The roller 63 is rotatably supported by a sleeve 87. This sleeve has an opening rectangular in section extending therethrough. Through this opening extends a similarly shaped but unequally dimensioned pin 89. Two opposite sides of the pin fit snugly in the opening of sleeve 87. The other two sides are spaced from the walls of the opening as is shown by Fig. 1. The pin 89 at its ends is circular in section. One end 90 fits in a similarly shaped opening in the gear element 77 of the carrier. The other end 92 is rotatably supported in a plug 93 inserted into a round opening in the carrier and held thereby by a pin 95. This construction permits the insertion of the pin 89 through the carrier opening. A pin 91 extends diametrically through pin 89, its ends being supported in sleeve 87. This pin is inclined to a line joining the points of contact between the roller and the discs, and also is inclined to the long axis of the carrier. These lines are marked c—c and d—d on Fig. 1. Preferably the angular position of the pin locates it midway between the lines d—d and c—c. The pin 89, which carries pin 91, is not fixed in the position shown. It may swing through an angle of 90°. Means are provided to limit its swinging movement in each direction. The plug 93 has segmental parts 99 (see Fig. 3) which may be engaged by the flat surfaces 100 or 102 on each end of a part 97 of the pin 89 between its rectangular intermediate part and its end circular part. It is intended that the pin 89 shall be in one or the other of its two extreme positions when the rollers are rotating. When it is in one position it may be shifted to the other by a reversal of rotation of the discs and rollers. This takes place as follows: It will be seen that the radius of the ends of pin 89 is less than the radius of the sleeve about which the roller turns. In consequence the friction at the latter surface, due to the roller turning about the sleeve, overcomes the friction at the ends of the pin 89 in its bearings and rotates the sleeve and with it the pin since the sleeve has a non-rotatable mounting on the pin to its opposite limiting position, the position, for example, wherein faces 102 engage the parts 99. The result of thus reversing the position of the pin 89 is to reverse the position of the inclined pin 91 to the end that opposite inclinations may be imparted to the roller when the roller is rotating in opposite directions to thereby permit the same ratio changes being made regardless of the direction of driving for the same sense of external control action.

The above described movements of the secondary rollers are accomplished by the tilting movement of the carrier 101, the carrier of the master roller 73. This carrier 101 is mounted in opposite arms of the spider just as are the carriers 75 for the follower rollers. The carrier 101 is provided with a gear 103 which meshes with gear 65. When the carrier is rocked in its bearings its gear element 103 rotates gear 65 and with it sleeve 63' and gear 67. In this way the follower rollers are all inclined to the same extent. A plug 105 is inserted in a circular opening 107 in carrier 101. It is externally of circular outline and is designed to fit a similarly shaped opening in the carrier, but it has flat surfaces 109 on opposite sides. It has a reduced upper end which is secured by a pin 111 to the wall of the carrier. The plug has a central opening to receive the upper end of pin 113. The other end of pin 113 is received within an opening of the gear portion of the carrier. The element 113 is pivoted to the sleeve 115 by pin 117 as shown in Fig. 2. The sleeve 115 rotatably supports the master roller 73. This sleeve extends upwardly through the carrier occupying the region within the circular opening 107 provided by the formation of the flat surfaces of the plug. At its upper extremity it is attached to a control rod 119 by a connecting pin 121. The external surface of pin 113 is rectangular except at the ends where it is mounted in the carrier and plug. This rectangular portion extends through a similarly shaped opening in the sleeve 115 but with clearance to permit the sleeve and roller to rotate about an axis b—b, Fig. 1, this axis being the line joining the points of contact between the roller and disc. As a result of this clearance, movement imparted to the sleeve by the rod 119 is operable in a way to be explained below to incline the roller 73 about the line b—b. There then follows a movement of the roller and sleeve due to its direction of driven rotation and to its inclination which restores the roller to a position in which an angular position is assumed to produce a new driving ratio and in which also the axis of rotation again intersects the main axis of the transmission. In so assuming a tilting position the carrier rotates to a new position of tilt, which carrier rotation rocks the gear 65, sleeve 63', and gear 67, thereby similarly effecting new driving ratios in the case of each of the follower rollers.

The above described inclination of sleeve 115 is brought about by the following mechanism including the rod 119 already referred to. This rod has a head 125 with flanges 122 and 123. Between these flanges are received extremities of the ends of the sleeve 115. The rod 119 has a slot 129 for a purpose to be described. It also has an offset end 131 with arms 133 carrying tapered pins 135. A control block 139 has on opposite faces tapered recesses as at 137 to receive the tapered pins 135. One face of the block has a pin 141. The ends of the block are provided with slots 143, each slot having two parts of unequal transverse dimensions. The portions of the slots having equal dimensions are at the corresponding ends of the end faces. Secured to the main housing is a small housing 158. This housing has a wall 159 provided with a rotatable bearing support 160 for a shaft 153. Adjacent its other end shaft 153 has a second bearing 161 in a partition of the small housing. Shaft 153 has a flange 151 from which extend radial arms 149 carrying spherical members 147 and 147' as shown. From flange 151 there extends an upwardly directed arm 155 provided with a pin 157. A rod 163 (see Fig. 1) is connected to pin 157. Rods 163 and 17 are united by a housing 165 enclosing springs whereby a resilient push or pull may be imparted to effect rotation of shaft 153 either from the action of the governor or by a force applied to rotate the journal extension 167 of pivot member 18. Such a rotation of shaft 153 through the reciprocation of rod 163 is intended to change the driving ratio through the instrumentality of the control block and rod 119 as will be explained below.

For the purpose of reversing the direction of inclination imparted to the roller 73 when its driving direction is reversed, the following expedient is employed. A coil spring 175 snugly embraces shaft 31. It has at one end a relatively short radial arm 179 and at its other end a somewhat longer radial arm 181. The spring is encompassed by a sleeve 177. The sleeve has at one end a slot 183 and at its other end a slot 197. It also has an operating arm 195 projected radially. A tubular shaped member 185 encloses the sleeve 177 and the spring when the latter is assembled within the sleeve. This member 185 is provided with a flange 187 which is secured to the spider by fastening means 189. The member 185 has a slot 193 through which the arm 195 extends and the end walls of which slot limit the rotation of the sleeve 177 by engagement with the arm 195. A pin 191 projects inwardly and radially from the member 185 and lies in the path of the rotary movement of the end 179 of the spring 175 as it rotates with shaft 31. This member 185 also has a radial flange 199 projecting inwardly to engage and limit the inward axial movement of the sleeve 177. On the end of member 185 is a slot 200 through which the spring end 181 also extends. If the shaft 31 reverses its direction of rotation and starts to turn in the direction of the arrow (Fig. 7) the spring end 179 first engages the Y end of the slot 197. The resistance to rotation on the part of sleeve 177 (owing to the parts operatively connected therewith) makes of this engagement a momentary anchorage for the right end of the spring. The rotation of the shaft serves to wrap the spring and so contract it that it grips the shaft 31 and rotates with it and carries the sleeve 177 until the arm 195 engages the end of the slot 193. Thereafter the spring end 181 engages the Z end of slot 200 in 185 as a positive stop and the action of the spring ceases and relieves the grip of the spring on the shaft. In a similar way reverse rotation of the shaft causes the spring to reverse the direction of rotation of the sleeve 177. The end 181 engages the X end of the slot 183 of sleeve 177, thus affording a momentary anchorage. The rotation of the shaft as before wraps the spring 175 on shaft 31 and causes it to rotate the sleeve 177 to its limiting position. The pin 191 constitutes the limiting stop for the spring whereby it is rendered inoperative.

The reversing rotation of collar 177 is imparted to the control block by the following mechanism. A shaft 171 projects from the open end of the spider carried plug 79'. Shaft 171 is supported at its other end by a portion of the spider. Slidable on the shaft 171 is a collar 169. To permit reciprocation of the collar on the shaft 171 and to prevent rotation of said collar there is a pin 203' projecting from the collar and extending through the opening 129 of the control bar 119. Pivoted to the spider is a double arm lever 203. One arm of the lever engages between the flanges of the collar 169 in such a way that rocking of the lever shall reciprocate the collar. An adjustable link 201 connects the other arm of the lever 203 to the end of arm 195 on the sleeve 177. A link 173 connects the collar 169 with the pin 141 on the control block 139. As a result of this construction the rocking of arm 195 on the sleeve 177, whenever the direction of rotation of the shaft is reversed, operates through the instrumentality of link 201, lever 203, collar 169, and link 173 to rock the block 139 and to thereby shift one of its slots to an inoperative position relative to its cooperating spherical member 147 and 147', and to shift the other slot so that its narrow part is brought into operating relation to the spherical member with which it is associated. In this way one direction of rotation of shaft 153 produces opposite directions of inclination for opposite rotary movements of shaft 31, a condition necessary to cause subsequent restoration movements such as to effect the same ratio changing tilt regardless of whether the vehicle is being driven forwardly or rearwardly.

The shifts to higher and lower ratios need to be controlled to prevent too rapid changes as influenced by the governor or by forces applied to shaft 167. To this end the housing 158 is formed with a cylinder 213 within which reciprocates a piston 211 carried by a rod 209, this rod being connected to an arm 207 secured to shaft 153. This piston and cylinder construction is intended to constitute a dashpot to control the rate of ratio changing. The edge of the piston is preferably rounded as shown to make a snug fit at all times regardless of the angular relation of the parts 207 and 209. The piston has a restricted opening 215 for the passage of fluid in the cylinder from one side to the other of the piston. There is also a bypass 217 communicating with the cylinder at a mid position and also with the lower end of the cylinder. In the bypass is a spring-pressed valve 219 operable to close and prevent the passage of fluid as the piston moves downwardly from its mid position in the direction corresponding to lower driving ratios. A rod 221 is mounted to reciprocate in a passage in alignment with the bypass passage. This rod may engage and depress the valve member 219 so that the bypass together with the opening 215 provide for free passage of fluid from below to above the piston. For the purpose of reciprocating rod 221 a rod such as 223 may be provided to reciprocate at right angles to rod 221. Rod 223 may have a tapered end to engage and move the rod 221. Any preferred means may be used to actuate this rod 223. When stopping the car with the brake it is very desirable that the piston in the dashpot 213 should not delay the shift to low speed. It may be well therefore to connect the rod 223 to the brake hook-up so that the application of the brake may be accompanied by an opening in the bypass to permit a quick shift to low speed. Any convenient method may be adopted for that purpose. In Fig. 1 has been shown a lever member 301 engaging the rod 223 and suitably connected to any conventional brake hook-up designated as 303.

It may be desirable to provide on the instrument board a suitable instrument to indicate the prevailing speed ratios. Such instruments operated by rheostats are well known. There is shown in connection with this transmission a suitable operating connection for such an instrument. Within cover member 237 is provided a substantially conventional rheostat employing a coil 305 and a contact arm 307. This contact arm is carried on the end of a shaft 227 mounted in a bracket 229'. On the end of the shaft 227 is a gear member 229 which is in mesh with a gear member 231 carried on a tubular shaft member 233. This shaft member is secured by fastening means 235 to the end of shaft 153 as shown in Fig. 4. In this way the rotation of shaft 153 operates through the gearing elements and the rheostat to give visible indication of the existing gear ratio which is determined by the angular position of shaft 153. For the purpose of limiting the rocking of the carriers a suitable abutment may be provided on the carrier and spider as represented by numeral 315 on Fig. 4. Also, to limit the rotation which may be imparted to shaft 153 an abutment 317 may be added to the wall of the secondary housing 158, this abutment to be engaged by an adjustable screw member 319 carried by an arm on the shaft 153, which may, if preferred, constitute an integral part of arm 207.

In the operation of the device the power from the engine rotates through the clutch and gearing in housing 9 to rotate the input shaft 15 in either a forward or reverse direction. As in constructions of this kind the gearing in box 9 may be placed in neutral, in which case no drive is transmitted through the transmission. Rotation of shaft 15 rotates the disc 19 which latter operates through roller 73 and rollers 63 to drive the driven disc 37 and 39. The drive of these discs is transmitted to the driven shaft 31. Normally the spring 45 provides resilient pressure between the discs and rollers. In the event of unusual heavy driving torque the rollers 49 cooperate with the cam faces 52 to supply additional pressure between the rollers and discs to avoid slipping.

At starting the rollers drive the discs 37 and 39 at lowest speed ratio. As the speed of the input shaft increases the governor operating through the instrumentality of rodding 17 and 163 rocks shaft 153. The rocking of shaft 153 to change the ratio from low speed toward higher speeds raises the piston 211 in the dashpot cylinder 213. The movement of the piston through the fluid retards the shifting movement and thereby prevents too rapid shifts. From a position of the piston as shown in Fig. 4 to its uppermost position corresponding with which the ratio is at overspeed, the passage 215 affords the means for checking too rapid changes. As the shaft 153 rocks it rotates block 139 and with it rod 119. Rod 119 being connected to the upper end of the sleeve 115 tends to rock the sleeve and roller in a direction to change the speed ratio. This is in effect a tendency to rock these parts about the line a—a, Fig. 1. Such tendency meets with considerable resistance for the reason that such a movement involves sliding friction between the rollers and discs. The pressure of the spherical member on the block may, however, be considered as a pressure operating to rotate the roller and its sleeve about the line b—b which is the line joining the point of contact between the roller and the discs. Clearance has been provided between the roller sleeve and the pin 113 so that such a movement may occur. This movement therefore which involves overcoming less resistance is the movement initially imparted to the roller and is described by the term "inclination". This inclination deflects the roller axis from intersection with the main axis and if unchecked would cause the roller to leave the disc. This position of the roller associated with the normal driving rotation causes the roller to describe a spiral path as a result of which it assumes a new position in which its axis intersects the main axis and in which it assumes a new position of tilt—a new driving ratio. Accompanying this spiral movement of the roller the carrier rotates to the new plane of the roller. As the carrier rotates it rotates gear 65, sleeve 63', and the gear 67. The follower rollers are then changed to new driving ratios as follows: The roller 63 of Fig. 2 may be taken as an illustrative example. The rotation of gear 67 rocks the roller carrier 75 in a direction of tilt, that is about axis d—d. This rotation is not accompanied by a tilting of the roller because of the resistance which would result from the sliding friction. Since the pin 89 is anchored at its end in the carrier it tilts with the carrier. This movement of the carrier and pin 89 relative to the sleeve and roller is permitted by the clearance between the pin and sleeve. The pin 89 carries bodily the inclined pin 91. Since the ends of pin 91 are on opposite sides of line d—d one end of the pin is depressed below and the other end raises above the plane of the paper (Fig. 1) as the carrier with its pin 89 is rocked. These forces acting upon the pin 91 pushing one end below and pulling the other end above the plane of the paper may be considered as operating to turn the roller about the line c—c joining the points of contact of the roller with the discs. This is precisely the action which takes place. The tilting of the carrier results first in an inclination of the roller, which inclination associated with the driving of the roller causes the roller to describe a spiral path and assume a new driving ratio position.

If now the direction of drive is reversed, each disc and roller has its rotation reversed. In order to secure the same ratio-changing effect through inclination and tilt the inclination of the master roller must be reversed. The reverse rotation of the master roller associated with a reversed inclination of the roller gives the same tilt to the roller and then to its carrier.

To get the reversal of inclination, the expedient shown in Fig. 7 is employed. As explained above, in the act of reversing the drive the sleeve 177 is rotated to its opposite position and in so rotating the sleeve rocks the block 139 to its new position about the tapered pins 135. When so rocked one of the ball members 147, 147' becomes inoperative since it enters the wide part of the slot, and the other ball member enters the narrow part of its slot and becomes operative. In consequence a given movement of rotation applied to rod 153 produces a reverse rocking of block 139 and imparts an opposite inclination to the roller 73. This reversal of the inclination together with the reversed direction of driving caused by a given rotation of 153 produced by the governer or by the applied force produces a similar speed ratio change in roller 73 and, of course, a similar rotation of gear 65 and with it of sleeve 63 and gear 67.

At the same time that the block 139 is being shifted by the change in direction of the drive, the pin 89 of each follower roller is being given a rotation through 90° as was explained above. It will be remembered that the pin is held in position by the engagement of its end faces 100 or 102 with the part 99 of the plug 93. When the drive is reversed the greater lever arm of the friction force between the roller and the sleeve as compared with the lesser arm of the friction force between the ends of the pin and the carrier cause the pin to be rotated to a new position in which the other of its end surfaces 100, 102 serves as a stop. In so rotating, the pin 91 is carried bodily so that its left end as in Fig. 1 is rotated below the line c—c. When now the rotation of gear 67 occurs under the influence of the changing of driving ratio position of the master roller carrier, the force impressed upon the ends of the pins 91 is reversed so that an opposite inclination is imparted to the follower roller. This opposite inclination and the reverse direction of drive combine to give the roller the same tilt and ratio driving position as before.

This reversibility as provided for the master roller and for the follower rollers thus makes it possible to secure the same ratio changing position for either direction of drive.

The dashpot serves to check too rapid shifting. When a quick shift to low speed ratio is desired as when coming to a stop under the influence of a brake, the rod 221 may be actuated to provide a free bypass action. If desired this may be associated with the brake rodding since it is when stopping the car with a brake that this free shift to low is most often desired. The use of the rheostat to operate an instrument to indicate the driving ratio position of the gearing is self-evident and requires no explanation.

The limiting means to check the inclination imparted to the master roller and to limit the rotating of the carriers will also be understood without further explanation.

Throughout this description no mention has been made of the lubricating features. As in devices of this kind the parts are apertured and pumps are provided to distribute lubricating oil to the several relatively movable parts. Since no lubricating details are being claimed herein it is deemed better to omit from the description the details relating to the provision for lubrication, although some of these details are shown in the drawings.

We claim:

1. In power transmitting mechanism having driving and driven discs, a master roller and a follower roller between said discs for transmitting driving motion, mechanism whereby a change in driving position of the master roller correspondingly changes the driving position of the follower roller, supporting means to mount the follower roller and mechanism to rotate said supporting means through a predetermined extent, said rotation producing mechanism being operable in response to a reversal of direction of rotation of said follower roller.

2. In power transmitting mechanism having driving and driven discs, a master roller and a follower roller between said discs for transmitting driving motion, mechanism whereby a change in driving position of the master roller correspondingly changes the driving position of the follower roller, supporting means to mount the follower roller and differential friction means to rotate said supporting means through a predetermined angular extent, the action of said friction means being responsive to a reversal of direction of rotation of said follower roller.

3. In frictional transmission mechanism comprising driving and driven discs, master and follower rollers between said discs for transmitting driving motion, mechanism whereby a change in driving position of the master roller correspondingly changes the driving position of the follower roller, a follower roller sleeve, a pin movably mounted within said sleeve, a second pin carried by the first pin and pivoted in said sleeve, said second pin positioned at an angle to a line joining the points of contact of the roller and discs.

4. In friction transmission, a single master roller mounted for inclination and tilt, means to incline said master roller, a follower roller mounted for inclination and tilt, mechanical connections independent of said means and operable by the tilting movement of the master roller to change the inclination and tilt of the follower roller.

5. In frictional transmission comprising a pair of discs and interposed master and follower rollers, mechanism operable from a remote point to incline said master roller, said mechanism comprising a sleeve about which said master roller rotates, a pin having a movement relative to said sleeve, a carrier supporting said pin, means whereby said carrier is rocked by the tilting movement of the roller from its inclined position, and gearing between said carrier and the follower roller.

6. In combination, a reversible driving element, a friction transmission operated thereby and having driving discs and rollers including a master roller and a follower roller, mechanism operable to incline the master roller whereby it rotates about its points of contact with the discs, and means operable by a reversal of direction of rotation of the transmission elements to shift said mechanism to produce opposite directions of inclination corresponding to opposite directions of rotation of the driving element together with means, independent of the mechanism to incline the master roller, whereby ratio-changing movements of the master roller produce like movements of the follower roller.

7. The invention defined by claim 6, said mechanism including a block mounted to move, connections from said block to said roller to incline said roller, and connections from said block to said means whereby the block is moved.

8. The invention defined by claim 6, said mechanism including a block having oppositely positioned slots, each slot having an operative and an inoperative part, an externally actuable part in each of said slots, each said part being rendered operable or inoperable by the movement of the block, and connections from said block to said means.

9. In change speed transmission having an input shaft, a driving disc connected therewith, an output shaft, a driven disc connected thereto, rollers interposed between said discs, one of said rollers being the master roller and another a follower roller, mechanism to incline the master roller in directions variable with the opposite direction of drive of the input shaft, and means independent of said mechanism and responsive to ratio-changing movements of the master roller to produce like movements of the follower roller.

10. The invention defined by claim 9, said mechanism comprising a coil spring frictionally engaging one of said shafts, a sleeve surrounding said spring, means on said sleeve to momentarily anchor one end of said spring and to cause said spring to contract as a result of the rotation of the shaft to thereby grip the shaft and rotate said sleeve, and a fixed stop to engage the other end of said spring and render it inoperative after functioning to rotate the sleeve.

11. The invention defined by claim 9, said mechanism comprising a coil spring frictionally engaging the output shaft, said spring having terminal abutments, a sleeve surrounding said spring having end notches to engage the one or the other of said abutments to momentarily anchor the spring whereby the spring becomes wrapped and operates to rotate the sleeve, and a member having fixed abutments to engage the one or the other of the spring abutments after the spring has functioned to rotate the sleeve.

12. In a transmission, a housing, a driving disc, oppositely arranged driven discs and rollers interposed between said discs, one of said rollers being a master roller, means to incline said master roller independently of a movement of the other rollers, carriers supporting said rollers, gearing between said carriers whereby a tilt of one carrier tilts the other carriers, a spider, said carriers being rotatably supported by said spider and said gearing being mounted in fixed relation to said spider, said spider being mounted in said housing.

13. In combination, a change speed transmission comprising a driving shaft, a disc rotatable therewith, a driven shaft, driven discs rotatable therewith one on each side of the driving disc, rollers interposed between said discs, each roller being mounted for inclination and tilt, a tube coaxial with said shafts and toothed gearing between each of said rollers and said tube operable when a single master roller is inclined similarly to incline and tilt the other rollers.

14. In a friction roller transmission, discs and rollers, yielding means to normally maintain pressure between said discs and rollers, torque-responsive means to supply additional pressure, and yielding means in series with said torque-responsive means to prevent looseness when relieved of load.

JOHN O. ALMEN.
JACOB EHRLICH.
WINFIELD D. GOVE.